(12) United States Patent
Macek et al.

(10) Patent No.: US 9,055,509 B2
(45) Date of Patent: Jun. 9, 2015

(54) SITUATION-AWARE MESSAGE PRESENTATION FOR AUTOMOTIVE MESSAGING

(75) Inventors: Tomas Macek, Prague (CZ); Jan Kleindienst, Nove Straseci (CZ); Martin Labsky, Prague (CZ); Holger Quast, Merelbeke (BE); Jan Curin, Prague (CZ)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 13/332,765

(22) Filed: Dec. 21, 2011

(65) Prior Publication Data

US 2013/0165165 A1 Jun. 27, 2013

(51) Int. Cl.
H04M 1/00 (2006.01)
H04W 48/04 (2009.01)
H04L 12/58 (2006.01)

(52) U.S. Cl.
CPC ............. H04W 48/04 (2013.01); H04L 51/043 (2013.01)

(58) Field of Classification Search
USPC .......................... 455/466, 412.1–412.2, 569.2
See application file for complete search history.

(56) References Cited

U.S. PATENT DOCUMENTS

| | | | |
|---|---|---|---|
| 7,856,203 B2* | 12/2010 | Lipovski | 455/1 |
| 8,270,933 B2* | 9/2012 | Riemer et al. | 455/345 |
| 8,401,578 B2* | 3/2013 | Inselberg | 455/466 |
| 8,417,268 B1* | 4/2013 | Halferty et al. | 455/466 |
| 8,559,932 B2* | 10/2013 | Elliott et al. | 455/418 |
| 2004/0037236 A1 | 2/2004 | Massey et al. | |
| 2005/0030184 A1 | 2/2005 | Victor | |
| 2006/0206816 A1 | 9/2006 | Nordenhake | 715/534 |
| 2008/0079753 A1 | 4/2008 | Victor et al. | 345/660 |
| 2009/0149168 A1* | 6/2009 | McLean | 455/418 |
| 2010/0113073 A1* | 5/2010 | Schlesener et al. | 455/466 |
| 2012/0282906 A1* | 11/2012 | Frye et al. | 455/414.2 |

FOREIGN PATENT DOCUMENTS

| | | | |
|---|---|---|---|
| EP | 0180047 | 5/1986 | ............. G06F 3/16 |
| WO | WO 9935008 | 7/1999 | ............. B60R 16/02 |
| WO | WO 2009040643 A2 | 4/2009 | ............. B60K 37/06 |

OTHER PUBLICATIONS

European Patent Office, Officer Patrick Brachmann, International Search Report and Written Opinion, PCT/US2011/037535, date of mailing Nov. 20, 2012, 6 pages.
European Search Report for European Application No. 12177869.0-2416 dated Nov. 16, 2012, 8 pages.

\* cited by examiner

Primary Examiner — Brandon Miller
(74) Attorney, Agent, or Firm — Daly, Crowley, Mofford & Durkee, LLP

(57) ABSTRACT

A text message processing arrangement is described for use in a mobile environment. A mobile messaging application processes user text messages during a user messaging session. A user state model reflects situational parameters to characterize user cognitive load. A functionality control module adjusts functional performance of the mobile messaging application based on the user state model.

29 Claims, 2 Drawing Sheets

SITUATION-AWARE MESSAGE PRESENTATION FOR AUTOMOTIVE MESSAGING

TECHNICAL FIELD

The present invention relates to natural language understanding technology, and more specifically to situation-aware message handling in a mobile messaging application.

BACKGROUND ART

Instant messaging (IM) has become part of everyday life and its users require IM availability in many different situations. IM is commonly mediated through a broad range of devices including computers, tablets, and cell phones. However, these devices are not very appropriate for some mobile environments such as in-car use. Their handling requires significant attention from the user, which can result in dangerous driver distraction. While in some driving situations it may be dangerous to perform any extra tasks such as instant messaging, there also are situations when it can be relatively safe.

SUMMARY

Embodiments of the present invention are directed to a text message processing arrangement for use in a mobile environment such as the passenger compartment of an automobile. A mobile messaging application such as an instant messaging application processes user text messages during a user messaging session. A user state model reflects situational parameters to characterize user cognitive load. A functionality control module adjusts functional performance of the mobile messaging application based on the user state model.

The functionality control module may adjust functional performance of the mobile messaging application using a safe/dangerous classification based on the user state model. The functional performance which is adjusted may include at least one of a message summarizing functionality, a messaging sequencing control functionality, initiating presentation of a new message, continuing presentation of a current message, and form of user interaction such as: speech interaction, text interaction, and interaction speed. And the mobile messaging application may further provide a user status update output indicating the current status of a system user based on the user state model.

The situational parameters may include some number of recent events, parameters characterizing the passenger compartment environment, and/or parameters characterizing an automobile driving environment such as: automobile speed, approaching objects, traffic, conditions, road conditions, weather conditions, and physical environment conditions.

DETAILED DESCRIPTION

Embodiments of the present invention are directed to a text messaging system for use in a mobile environment such as automotive messaging. Instant messaging, emailing, and/or social media messaging (e.g., Twitter, LinkedIn, Facebook etc.) and possibly other information processing components are integrated into a single system and human-machine interface using speech inputs and/or outputs. For such automotive applications the system takes into account the driving situation and adapts its mechanisms and functionality so that the user cognitive load is always safe. The behavior of the system is adapted depending on the state of the driver, the situation in the car, and the driving situation. Other parties can be notified of the user's current situation to allow them to consider how much attention they request from him. For example, a phrase can be added to the first chat message of a given dialog: "user X is currently driving in high-speed traffic and dictating messages with Dragon Dictation software by Nuance."

Figure 1:
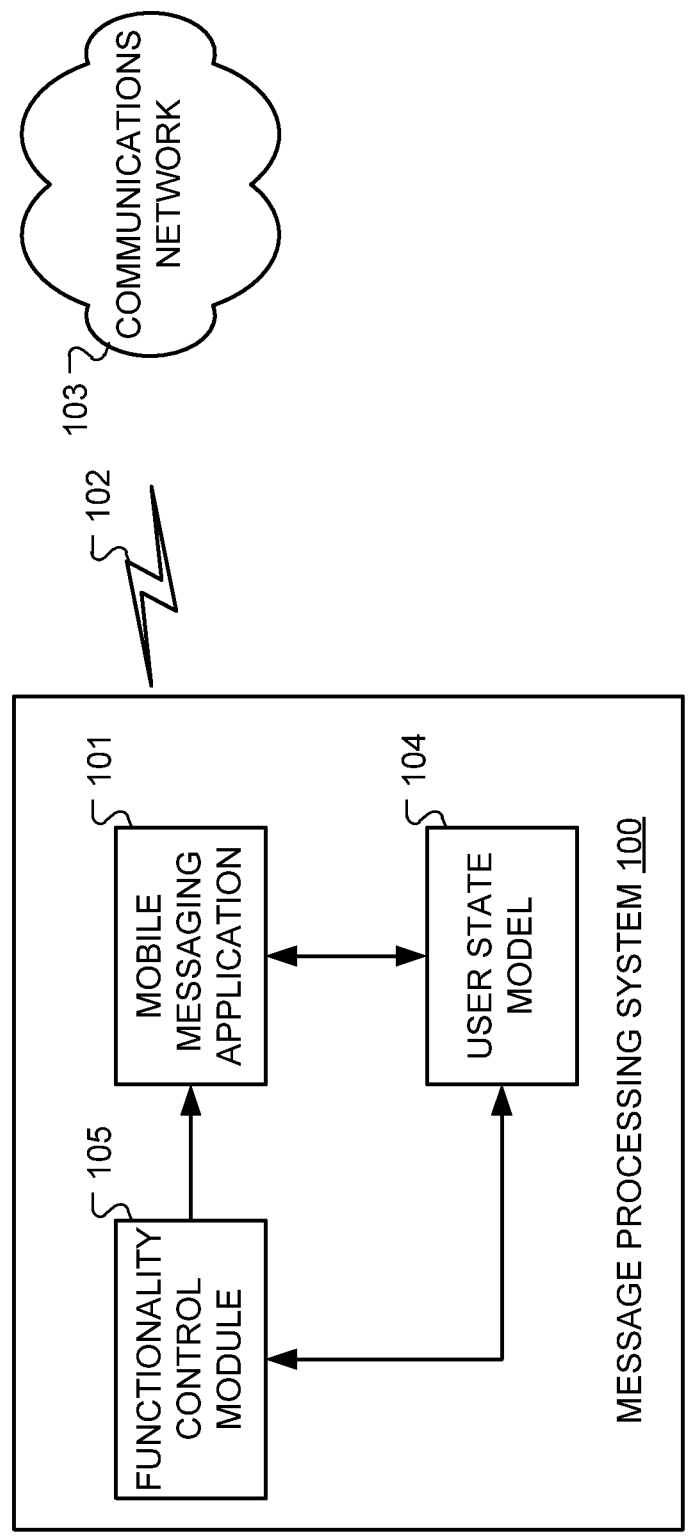
FIG. 1 shows a text message processing system according to one embodiment of the present invention.
Figure 2:
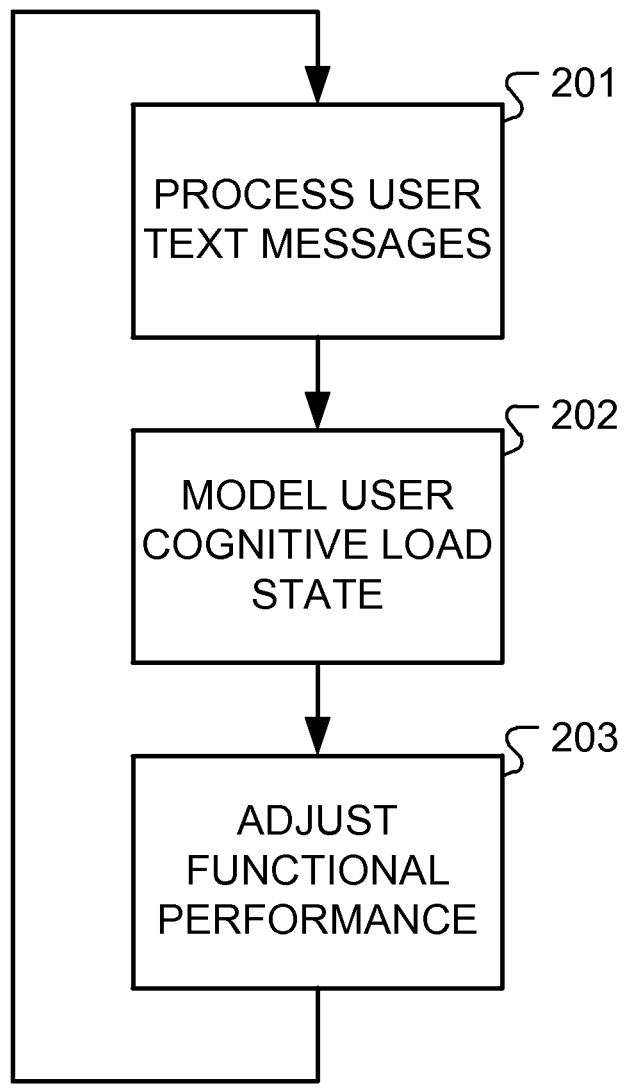
FIG. 2 shows various functional steps of situation aware processing of text messages according to an embodiment.

FIG. 1 shows a text message processing system 100 and FIG. 2 shows various functional steps in situation aware processing of text messages according to one embodiment of the present invention. During a user messaging session, a mobile messaging application 101 processes at least one user text message, step 201, received by wireless link 102 from a communications network 103 connected to other text messaging systems. For example, the mobile messaging application 101 may perform speech processing of the text messages such as by automatic speech recognition (ASR) and/or text-to-speech (TTS) speech synthesis. A user state model 104 characterizes user cognitive load, step 202, accumulating situation clues and building a model of the user cognitive state based on situational parameters such as some number of recent events, parameters characterizing the passenger compartment environment, and/or parameters characterizing an automobile driving environment such as: automobile speed, approaching objects, traffic, conditions, road conditions, weather conditions, and physical environment conditions.

The user state model 104 can collect information about the current road situation by observing clues from variety of sensors such as:

Sensors indicating distance from closest obstacle in front of car; speed of approaching the closest obstacle.
Sensors indicating discrepancy between direction of the car and direction of the road.
GPS and geographic information providing the information about quality of road, closest intersection, profile of the road.
Detection of overtaking based on clues from GPS, lane tracking subsystem, time evidence.
Sensors of other activities in a car—manual and automatic gear shifting, controlling radio, air-conditioning . . . .
Detection of human conversations in a car.
Rain sensors, windshield wipers activity, or temperature outside.
Car speed with respect to road type.
Stress or fatigue detection based on analyses of voice, face, or additional biometric information about the driver.

Applicant notes that some sensor situational parameters are independent of user action, such as rain detection, and some are dependent upon user action, such as vehicle speed.

A functionality control module 105 then adjusts functional performance of the mobile messaging application, step 203, based on the user state model 104, for example, by making a safe/dangerous classification. The functional performance adjusted by the functionality control module 105 in step 203 may include at least one of a message summarizing functionality, a messaging sequencing control functionality, initiating presentation of a new message, continuing presentation of a current message, and form of user interaction such as: speech interaction, text interaction, and interaction speed.

For example, the functionality control module 105 may classify the current driving situation and make functionality decisions such as:

(1) Is the information allowed to play?
(2) Should the current playback be allowed to complete or should it be interrupted?
(3) How the message should be rendered (messages playback/beep/graphical display)?
(4) What should be the prosody and speed of the playback?

Informational data such as from GPS+map+destination can be used to plan system intervention/adjustments, for example, some or all of the current messages may not be played back when the vehicle is close to a busy difficult intersection or the simultaneous (to audio playback) graphical display may be used only when the car is parked or at low speed.

The user state model 104 and/or the functionality control module 105 can empirically weight the sensor data and combine their values to one or more user distraction measures such as a multi-dimensional distraction vector. A set of rules and the values of the distraction vector can be used to determine how to handle of a system announcement (playback of incoming message, status change report). Distraction measures also can reflect delayed impacts of certain events. For example, shortly after gear shifting the user is likely to be occupied by handling the impact of the shift (car acts differently).

When the distraction vector indicates mild to moderate user distraction (i.e., moderate cognitive load) message playback may be delayed (e.g., by a few seconds) in expectation of an upcoming better cognitive situation. Previously played messages may be uninterrupted while new playbacks may be postponed. In addition or alternatively, message playback may be replaced by shorter messages such as a beep that announces arrival of a new message and/or playback of a shorter informational announcement such as: "message from John." Lower priority messages may not be played back at all. As the cognitive load and distraction level increases higher, the system functionality may be altered accordingly. For example, all message playbacks may be stopped immediately. The user may be able to control how much the system intervenes in the natural flow of the conversation (message processing) by setting one or more operating thresholds.

The mobile messaging application 101 may also provide a user status update output over the wireless link 102 to other users in the communications network 103 to indicate to them the current status of a system user based on the user state model 104. User status can be set automatically based on the accumulated situational clues. For example a user status "incar busy" can indicate that user is busy by handling the current driving situation. Other user status message examples include without limitation: in car, busy in car, bored in car, stuck in traffic, on the phone in the car, chatting in car, etc. User status may be reported automatically based on the driving situation (i.e., from the user state model 104). In addition or alternatively, user status outputs may be set manually by voice commands from the user. Examples of related voice commands include:

USER: (Stop|Start) reporting status
USER: Set status to (busy|offline| . . . )

Similarly, the message processing system 100 may inform the user may about the status of other messaging parties (e.g., in a chat conversation and/or from a user contact list) based on the status of the user state model 104, for example, by voice only when the driving cognitive load is low enough. The user may be able to restrict notifications or completely switch them off. Status messages can be reported based on driving conditions, for example when user is busy when turning at an intersection, announcements may be postponed. Examples of related voice commands and notifications include:

SYSTEM: User X (became active|is in a car|is busy| . . . )
USER: Report status change of X and Y
USER: What is the status of X?
SYSTEM: X is offline
USER: Who is active from group Z?
SYSTEM: Peter and John are active in group Z Text messages can pop up asynchronously and so the playback of them might overlap. Thus the message processing system 100 may include a serialization module to ensure ordered playback of text messages. Serialization strategies may group together messages from a single conversation. Message serialization may be prioritized so that messages belonging to higher priority users are played back earlier. Brief system announcements of incoming text messages may be played instead of full message texts. Messages from users not in focus may be replaced by an earcon or a counterpart name playback announcing message arrival (without playing the message text back). Message playback may be controlled based on driving situation (GPS+map info, sensors, steering wheel activity, and turn signals). The serialization strategies may be customizable by system software and/or manually by the user. The user may be able to later request by voice command a full version of any shortened messages. Examples of related voice commands include:

USER: What happened?
SYSTEM: Martin logged off Message from John: Hello
USER: (List|Play) new messages. (Referring to shortened messages not played back yet or played in shortened form)

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions, which are executable by a processor, fixed either on a tangible medium, such as a computer readable medium (e.g., a diskette, CD-ROM, ROM, or fixed disk) or transmittable to a computer system (e.g., a computer including processor), via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A text message processing system for use in a mobile environment, the system comprising:
    a mobile messaging application for processing user text messages during a user messaging session;
    a user state model characterizing a cognitive load of the user based upon situational parameters including vehicle sensor information for a vehicle driven by a user, wherein the situational parameters are dependent upon user action, wherein the situational parameters include passenger compartment environment and vehicle speed,
    wherein the system determines, using a processor, a plurality of distraction levels from the situational parameters, wherein each of the plurality of distraction levels corresponds to the cognitive load of the user, wherein a first one of the distraction levels is based upon a first one of the situational parameters corresponding to the passenger compartment environment and a second one of the distraction levels is based upon the vehicle speed; and
    a functionality control module for adjusting functional performance of the mobile messaging application based on the distraction levels, such that a first one of the plurality of distraction levels corresponds to no message playback at all and a second one of the plurality of distraction levels corresponds to not playing back a message having a low priority.

2. A system according to claim 1, wherein the situational parameters include number of recent events.

3. A system according to claim 1, wherein the mobile environment is the passenger compartment of an automobile.

4. A system according to claim 3, wherein the situational parameters include one or more parameters characterizing a passenger compartment environment.

5. A system according to claim 3, wherein the situational parameters include one or more parameters characterizing an automobile driving environment.

6. A system according to claim 5, wherein the situational parameters include one or more parameters characterizing approaching objects, traffic conditions, road conditions, weather conditions, and physical environment conditions.

7. A system according to claim 1, wherein the functional performance includes at least one of initiating presentation of a new message, continuing presentation of a current message, and form of user interaction.

8. A system according to claim 7, wherein the form of user interaction includes at least one of speech interaction, text interaction, and interaction speed.

9. A system according to claim 1, wherein the functional performance includes a message summarizing functionality.

10. A system according to claim 1, wherein the functional performance includes a messaging sequencing control functionality.

11. A system according to claim 1, wherein the mobile messaging application further provides a user status update output indicating the current status of a system user based on the user state model.

12. A system according to claim 1, wherein the mobile messaging application is an instant messaging application.

13. The method according to claim 1, further including generating a status update for the user corresponding to the distraction level of the user for transmission to other users via a wireless link.

14. The method according to claim 13, wherein the status update comprises one or more of in car busy, in car, stuck in traffic, and/or on phone.

15. The method according to claim 13, further including receiving a status for other messaging parties.

16. The method according to claim 13, further including postponing messages for the status for other messaging parties based upon driver conditions for the user.

17. A method of processing text messages in a mobile environment, the method comprising:
    processing user text messages in a user messaging session with a mobile messaging application;
    characterizing a user cognitive load with a user state model based upon situational parameters, including vehicle sensor information for a vehicle driven by a user, wherein the situational parameters are dependent upon user action, wherein the situational parameters include passenger compartment environment and vehicle speed,
    determining a plurality of distraction levels from the situational parameters, wherein each of the plurality of distraction levels corresponds to the cognitive load of the user;
    wherein a first one of the distraction levels is based upon a first one of the situational parameters corresponding to the passenger compartment environment and a second one of the distraction levels is based upon the vehicle speed; and
    adjusting functional performance of the mobile messaging application based on the distraction levels, such that a first one of the plurality of distraction levels corresponds to no message playback at all and a second one of the plurality of distraction levels corresponds to not playing back a message having a low priority.

18. A method according to claim 17, wherein the situational parameters include number of recent events.

19. A method according to claim 17, wherein the mobile environment is the passenger compartment of an automobile.

20. A method according to claim 19, wherein the situational parameters include one or more parameters characterizing a passenger compartment environment.

21. A method according to claim 19, wherein the situational parameters include one or more parameters characterizing an automobile driving environment.

22. A method according to claim 21, wherein the situational parameters include one or more parameters characterizing automobile speed, approaching objects, traffic, conditions, road conditions, weather conditions, and physical environment conditions.

23. A method according to claim 17, wherein the functional performance includes at least one of initiating presentation of a new message, continuing presentation of a current message, and form of user interaction.

24. A method according to claim 23, wherein the form of user interaction includes at least one of speech interaction, text interaction, and interaction speed.

25. A method according to claim 17, wherein the functional performance includes a message summarizing functionality.

26. A method according to claim 17, wherein the functional performance includes a messaging sequencing control functionality.

27. A method according to claim 17, wherein the mobile messaging application further provides a user status update output indicating the current status of a method user based on the user state model.

28. A method according to claim 17, wherein the mobile messaging application is an instant messaging application.

29. A computer program product, comprising:
- a non-transitory computer readable medium having stored instructions that enable a machine to:
- process text messages in a mobile environment by processing user text messages in a user messaging session with a mobile messaging application;
- characterize a user cognitive load with a user state model based upon situational parameters, including vehicle sensor information for a vehicle driven by a user, wherein the situational parameters are dependent upon user action, wherein the situational parameters include passenger compartment environment and vehicle speed,
- determine a plurality of distraction levels from the situational parameters, wherein each of the plurality of distraction levels corresponds to the cognitive load of the user, wherein a first one of the distraction levels is based upon a first one of the situational parameters corresponding to the passenger compartment environment and a second one of the distraction levels is based upon the vehicle speed; and
- adjust functional performance of the mobile messaging application based on the distraction levels, such that a first one of the plurality of distraction levels corresponds to no message playback at all and a second one of the plurality of distraction levels corresponds to not playing back a message having a low priority.

* * * * *